(12) United States Patent
Abe et al.

(10) Patent No.: US 12,271,626 B2
(45) Date of Patent: Apr. 8, 2025

(54) READ ORDER DETERMINATION ON A TAPE

(71) Applicant: International Business Machines Corporation, Armonk, NY (US)

(72) Inventors: Atsushi Abe, Ebina (JP); Tohru Hasegawa, Tokyo (JP); Shinsuke Mitsuma, Machida (JP); Hiroshi Itagaki, Yokohama (JP); Noriko Yamamoto, Tokyo (JP); Tsuyoshi Miyamura, Yokohama (JP); Lucas Correia Villa Real, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/932,312

(22) Filed: Sep. 15, 2022

(65) Prior Publication Data
US 2024/0094949 A1   Mar. 21, 2024

(51) Int. Cl.
*G06F 3/06* (2006.01)

(52) U.S. Cl.
CPC .......... *G06F 3/0659* (2013.01); *G06F 3/0613* (2013.01); *G06F 3/0635* (2013.01); *G06F 3/0682* (2013.01)

(58) Field of Classification Search
None
See application file for complete search history.

(56) References Cited

U.S. PATENT DOCUMENTS

| | | | |
|---|---|---|---|
| 5,845,316 A * | 12/1998 | Hillyer | G06F 3/061 |
| | | | 711/158 |
| 9,513,818 B2 | 12/2016 | Whitney | |
| 9,619,147 B2 | 4/2017 | Katagiri | |
| 11,262,926 B1 * | 3/2022 | Animesh | G06F 3/061 |
| 2006/0127035 A1 * | 6/2006 | Shen | G11B 27/005 |
| | | | 386/E5.052 |
| 2012/0250176 A1 | 10/2012 | Katagiri et al. | |

(Continued)

FOREIGN PATENT DOCUMENTS

GB    2488932 A    9/2012

OTHER PUBLICATIONS

Executable file, Computer Hope, Dec. 16, 2018. (Year: 2018).*

(Continued)

*Primary Examiner* — Yaima Rigol
(74) *Attorney, Agent, or Firm* — Jeffrey Ingalls; Andrew D. Wright; Calderon Safran & Wright P.C.

(57) ABSTRACT

A computer implemented method includes receiving a list of areas on a subject tape to be read, wherein each area of the list of areas is indicated by a first record number and a last record number corresponding to the area, identifying parameters of a tape drive configured to read the subject tape, wherein the identified parameters of the tape drive contribute to a speed with which the tape drive can read the list of areas, creating a directed graph of the areas on the subject tape based on the identified parameters, wherein the directed graph indicates how long the tape drive will take to read the areas on the subject tape, and determining a fastest reading order of the areas on the subject tape, based, at least in part, on the directed graph and the identified parameters. A computer program product and computer system are also disclosed.

18 Claims, 5 Drawing Sheets

| TRAVEL POINT | TRAVEL TIME + FILTER APPLICATION TIME |
|---|---|
| CP → A | 40 + 0 = 40sec |
| CP → B | 30 + 10 = 40sec |
| CP → C | 10 + 10 = 20sec |
| A → B | 70 + 10 = 80sec |
| A → C | 40 + 10 = 50sec |
| B → A | 70 + 10 = 80sec |
| B → C | 30 + 0 = 30sec |
| C → A | 40 + 10 = 50sec |
| C → B | 30 + 0 = 30sec |

(56) References Cited

U.S. PATENT DOCUMENTS

| | | | |
|---|---|---|---|
| 2014/0268399 A1* | 9/2014 | Katagiri | G11B 5/00817 |
| | | | 360/48 |
| 2015/0113216 A1 | 4/2015 | Butt | |
| 2015/0347034 A1 | 12/2015 | Whitney | |
| 2016/0117111 A1 | 4/2016 | Katagiri | |
| 2022/0068303 A1* | 3/2022 | Malina | G11B 5/5547 |

OTHER PUBLICATIONS

"Patent Cooperation Treaty PCT Notification of Transmittal of the International Search Report and the Written Opinion of the International Searching Authority, or the Declaration", International application No. PCT/EP2023/070906, Date of mailing Oct. 25, 2023, 13 pages.

* cited by examiner

| TRAVEL POINT | TRAVEL TIME + FILTER APPLICATION TIME |
|---|---|
| CP → A | 40 + 0 = 40sec |
| CP → B | 30 + 10 = 40sec |
| CP → C | 10 + 10 = 20sec |
| A → B | 70 + 10 = 80sec |
| A → C | 40 + 10 = 50sec |
| B → A | 70 + 10 = 80sec |
| B → C | 30 + 0 = 30sec |
| C → A | 40 + 10 = 50sec |
| C → B | 30 + 0 = 30sec |

READ ORDER DETERMINATION ON A TAPE

BACKGROUND

The present invention relates generally to the field of tape drive implementations, and more specifically to determining read order on a tape.

In a linear tape drive, data is written while the tape is moved in the longitudinal direction. In the first write operation, data is written from the beginning of the tape to the end of the tape, and at the end of the tape, the head position is shifted vertically, and the operation is repeated from the end of the tape to the beginning of the tape. In this operation, a single write from the beginning of the tape to the end of the tape, or a single data stream from the end of the tape to the beginning of the tape, is called a wrap. The tape is divided into four areas in the horizontal direction, and each area is called a data band.

The helical scan method is used in tape drives such as digital data storage (DDS). In this method, the head is positioned so that it is in diagonal contact with the tape. The cylindrical head module in which the head is installed is rotated to record data diagonally on the tape at the same time as the tape is moved in the longitudinal direction. The helical scan tape drive is required to drive both the tape and the head, which makes it difficult to downsize the tape drive and complicates the assembly process. For this reason, the linear method has recently become the mainstream.

Active archiving is available as a means of not only using inexpensive tapes for simple backup and archiving but also accessing data in a relatively simple manner when needed. In an active archive environment, relatively long contiguous areas for, for example, typical backups and archives are rarely read by streaming, but multiple requests to read a short area are often issued.

SUMMARY

As disclosed herein, a computer implemented method includes receiving a list of areas on a subject tape to be read, wherein each area of the list of areas is indicated by a first record number and a last record number corresponding to the area, identifying parameters of a tape drive configured to read the subject tape, wherein the identified parameters of the tape drive contribute to a speed with which the tape drive can read the list of areas, creating a directed graph of the areas on the subject tape based on the identified parameters, wherein the directed graph indicates how long the tape drive will take to read the areas on the subject tape, and determining a fastest reading order of the areas on the subject tape, based, at least in part, on the directed graph and the identified parameters. A computer program product and computer system are also disclosed.

DETAILED DESCRIPTION

Tape devices are characterized by taking a long time to align the position to the target data. In processing multiple read requests to a short area of the tape, the order in which the data is read on the tape significantly affects the processing time. In the helical scan method, the data alignment enables the physical location of the data to be identified from the block number on the tape. In contrast, the linear method, in which data is recorded in a folded format, cannot estimate its alignment from the block number on the tape in principle.

Some tape drive solutions address this problem via Recommended Access Order (RAO). In RAO, the host gives the tape drive a list of areas on the tape to be read, consisting of the first record number and the last record number. The tape drive proposes the fastest reading order made from the received list of areas, based on the tape drive's own parameters such as tape acceleration and head movement speed in the horizontal direction, and returns it to the host. The fastest reading order is almost always the same as the shortest travel without any load on the tape, which is expected to extend the life of the tape.

The optimal reading order provided by RAO is implemented by obtaining an approximate solution to the so-called traveling salesman problem within the tape drive, and due to the resources and processing time of the tape drive, the maximum number of areas that can be specified is limited, for example, to 2,730 with respect to an explanatory embodiment. However, in reality, more than 10,000 areas may be read in a single request, in which case 2,730 areas are processed multiple times, but the fastest reading order or the shortest travel that does not overload the tape is not achieved.

To simply alleviate the problem caused by the upper limit of the maximum number of areas that can be specified, RAO can be implemented outside the tape drive by obtaining the location information about the areas to be read from the tape drive and using a traveling salesman problem solver prepared by an application on the host side. In current implementations, the location information about the areas to be read is obtained from the tape drive, and the solution to the traveling salesman problem is obtained from the static properties provided by tape drive specifications including, but not limited to, tape acceleration, maximum speed during locate, data band switching time, and wrap switching time. However, the reading order obtained from such implementation is the solution for the case where the tape drive and medium are maintained in an optimal state. In fact, the tape drive may temporarily adjust some of the read speeds or travel speeds to be unused, considering the compatibility between the medium and the head.

Besides, with a tape drive, the settings of the filter of signals from the head sometimes need to be changed in some areas on the medium that are hard to read. The time to reconfigure the filter settings takes about 10 seconds, which is not negligible if the changes occur frequently. In addition to the aforementioned already known findings, future problem analysis may reveal new parameters related to the reading order or a way to search for the shortest path with logic that is different depending on the internal state of the tape drive. Embodiments of the present invention use existing computational resources outside a tape drive to obtain an optimal solution for the information that a device dynamically has inside at a given point in time.

Descriptions of embodiments of the present invention within make reference to the travelling salesman problem (or the travelling salesperson problem or TSP). As used herein, the travelling salesman problem is effectively summarized as follows: Given a list of cities and the distances between each pair of cities, what is the shortest possible route that visits each city exactly once and returns to the origin city? The travelling salesman problem is both important and common in combinatorial optimization, theoretical computer science, and operations research. Further, TSP is used as a benchmark for many optimization methods, and though it can be computationally difficult, many heuristics and exact algorithms for solving the problem are known, such that some instances with tens of thousands of points can be solved completely, and problems with millions of points can be approximated within a small fraction of 1%. Example algorithms for solving the travelling salesman problem include, but are not limited to, the Held-Karp algorithm, branch-and-bound algorithms, the Multi-fragment algorithm, the nearest-neighbor algorithm, and the Match Twice and Stitch (MTS) heuristic.

Figure 1:
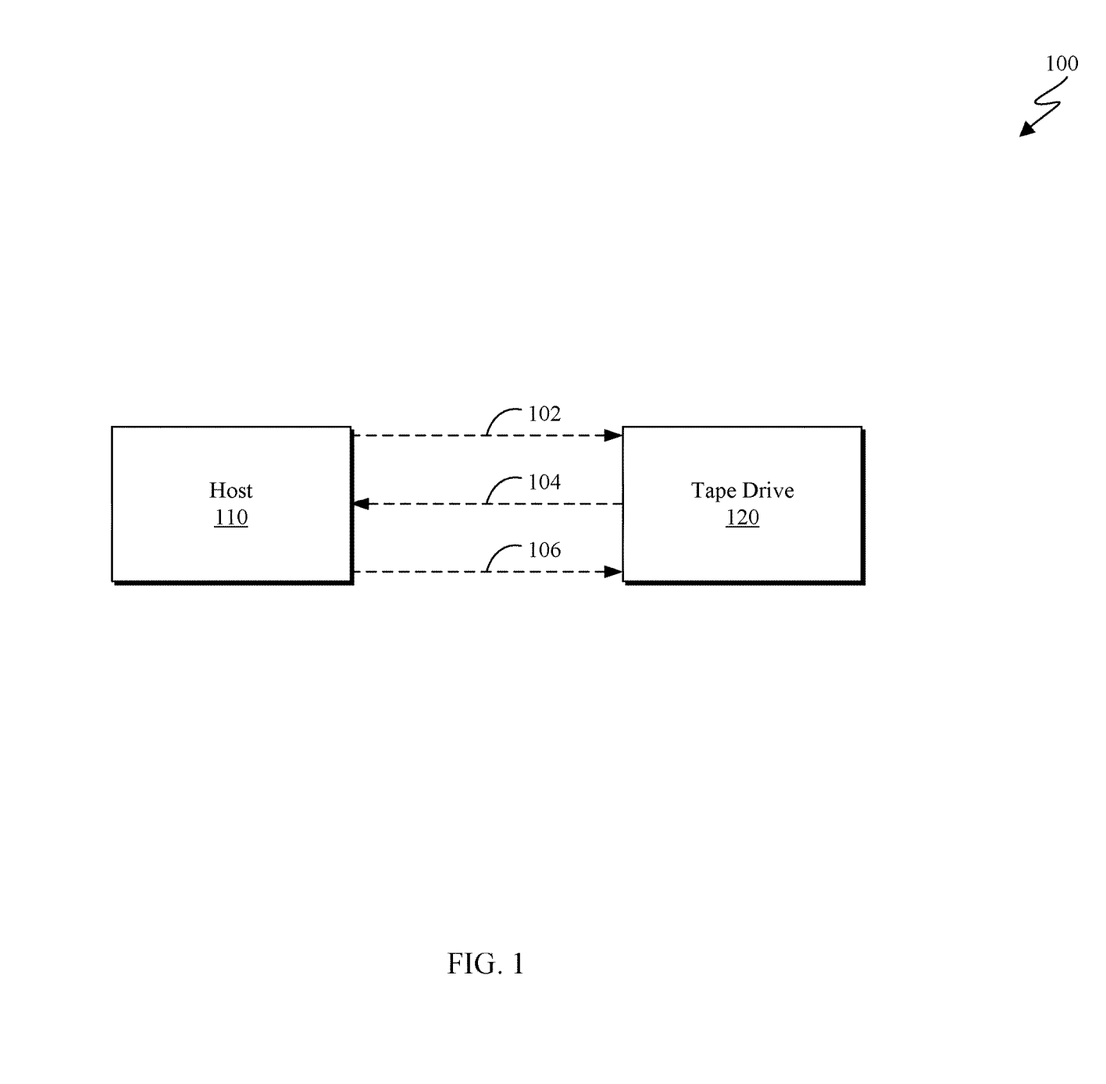
FIG. 1 is a functional block diagram of components of a tape drive management system in accordance with at least one embodiment of the present invention.

FIG. 1 is a functional block diagram of components of a tape drive management system 100 in accordance with at least one embodiment of the present invention. As depicted, tape drive management system 100 includes a host system 110 and a tape drive 120. In at least some embodiments, tape drive management system 100 is configured to execute a read order determination method, such as read order determination method 200 described with respect to FIG. 2. Tape drive management system 100 may enable increased efficiency in read order selection.

Host system 110 may be a computing system configured to host tape drive 120. While host system 110 and tape drive 120 are pictured separately with respect to FIG. 1, it should be appreciated that tape drive 120 may functionally be a component of host system 110; the separate depiction simply enables increased clarity with respect to the additionally depicted data transfers. Host system 110 can be a desktop computer, a laptop computer, a specialized computer server, or any other computer system known in the art. In some embodiments, host system 110 represents a computer system utilizing clustered computers to act as a single pool of seamless resources. In general, host system 110 is representative of any electronic device, or combination of electronic devices, capable of receiving and transmitting data, as described in greater detail with regard to FIG. 5. Host system 110 may include internal and external hardware components, as depicted, and described in further detail with respect to FIG. 5.

Tape drive 120 may be a data storage device that reads and writes data on a magnetic tape. Tape drive 120 may additionally include tape media on which tape drive 120 records and reads data. In general, tape drive 120 is a device capable of reading data stored on a data storage device such as a tape cartridge or other tape media.

While some computation may be achievable using tape drive 120, host system 110 may be configured to take over the computational burden from tape drive 120 when more efficient. In other words, host system 110 may be configured to dedicate available resources if they can execute the necessary computations more quickly than tape drive 120.

As depicted, host system 110 is configured to provide read information 102 to tape drive 120. In at least some embodiments, read information 102 includes a list of areas on a tape to be read. Read information 102 may include at least a first record number and a last record number for each area of the list of areas on the tape to be read. In at least some embodiments, the list of areas included in read information 102 corresponds to areas to be read with respect to a pending read instruction.

As depicted, tape drive 120 is configured to provide a directed graph 104 of the areas to be read. In at least some embodiments, tape drive 120 is configured to create a directed graph 104 of the areas to be read based, at least in part, on the received read information 102. Mechanisms for creating the directed graph are described in detail with respect to FIG. 2.

As depicted, host system 110 is configured to determine a fastest reading order of the areas to be read according to the received directed graph 104. In at least some embodiments, host system 110 is configured to consider specific applications of available computing resources within host system 110 when determining the fastest reading order; in other words, host system 110 may be configured to both determine a fastest reading order and simultaneously assign the corresponding read operations 106 to available system resources.

Figure 2:
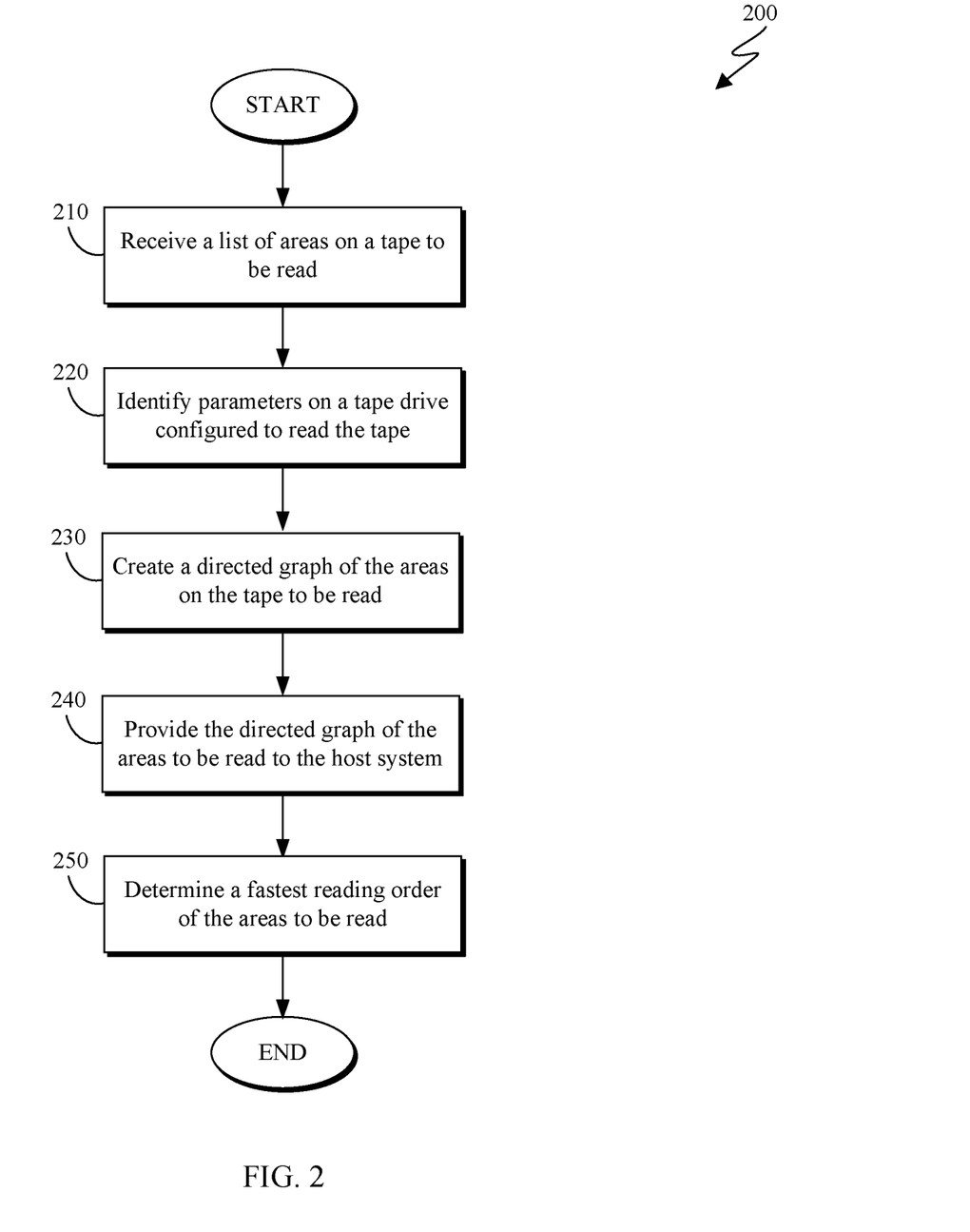
FIG. 2 is a flowchart depicting a read order determination method in accordance with at least one embodiment of the present invention.

FIG. 2 is a flowchart depicting a read order determination method 200 in accordance with at least one embodiment of the present invention. As depicted, read order determination method 200 includes receiving (210) a list of areas on a tape to be read, identifying (220) parameters of a tape drive configured to read the tape to be read, creating (230) a directed graph of the areas to be read based on the identified parameters, providing (240) the directed graph of the areas to be read to the tape drive, and determining (250) a fastest reading order of the areas to be read. Read order determination method 200 may enable increased speed and efficiency when reading areas from a tape.

Receiving (210) a list of areas on a tape to be read may include receiving, from a tape, an indication of areas on said tape to be read. In at least some embodiments, receiving (210) a list of areas on a tape to be read may include receiving a set of read operations necessitating the indicated areas of the tape to be read. Receiving (210) a list of areas on a tape to be read may include identifying areas of the tape pertinent to the received set of read operations. In at least some embodiments, receiving (210) a list of areas on a tape to be read includes receiving a first record number and a last record number corresponding to each area.

Identifying (220) parameters of a tape drive configured to read the tape to be read may include analyzing the tape drive to determine one or more parameters which could contribute to how long moving between areas to be read will take. In at least some embodiments, identifying (220) parameters of a tape drive configured to read the tape to be read includes identifying a set of static parameters corresponding to said tape drive. The set of static parameters may include, but is not limited to, tape acceleration, data band switching time, wrap switching time, distance between points, and tape travel direction. In at least some embodiments, identifying (220) parameters of a tape drive configured to read the tape to be read includes identifying a set of dynamic parameters corresponding to said tape drive. The set of dynamic parameters may include, but is not limited to, a maximum speed of the tape moving from a first point to a second point, a maximum speed for reading within a specified area, and a setup time of head parameters before reading a specified area. The dynamic parameters may differ depending on the subject areas of the tape.

Creating (230) a directed graph of the areas to be read based on the identified parameters may include creating a directed graph indicating an amount of time taken to move a tape head from a first area on a tape corresponding to a read operation to a second area on a tape corresponding to a read operation. In at least some embodiments, creating (230) a directed graph of the areas to be read may additionally include incorporating the amount of time to execute the read operations at the pertinent areas in addition to the travel time from the first area to the second area. Effectively, creating (230) a directed graph of the areas to be read includes using said areas as nodes for the previously discussed travelling salesman problem, and determining how long it will take to traverse the paths between said nodes. The identified parameters of the tape drive may contribute to the time taken to traverse a path between the two nodes.

Providing (240) the directed graph of the areas to be read to the host system may include transmitting the directed graph of the areas to be read to the host system. In at least some embodiments, providing (240) the directed graph of the areas to be read includes providing the path information rather than the entire determined graph. In at least some embodiments, providing (240) the directed graph additionally includes providing Java byte code of a program for solving the travelling salesman problem from the provided directed graph. Providing (240) the directed graph may additionally include providing intermediate language corresponding to the Java byte code. Since recent travelling salesman problem solvers are attainable with GPUs and multiple cores, a binary code compatible with said GPUs and cores may additionally be provided.

Determining (250) a fastest reading order of the areas to be read may include solving a travelling salesman problem with the areas to be read acting as the nodes. In at least some embodiments, determining (250) a fastest reading order of the areas to be read may include implementing a source code received from the tape drive for a program configured to calculate the fastest reading order. In such embodiments, the host system can create an executable file by compilation and linking and can call said executable as an external program. In such embodiments, the host system may additionally create a dynamic shared library from the source code and perform dynamic linking to call the function. In general, determining (250) a fastest reading order of the areas to be read includes minimizing the net time taken to move the tape head from one area to be read to another until all the areas to be read are read.

In at least some embodiments, read order determination method 200 additionally includes reading the areas to be read in the determined fastest reading order. In yet other embodiments, rather than executing the read, read order determination method 200 may provide instructions indicating the determined fastest reading order.

An example implementation of an embodiment of the present invention is described below. All metrics, measurements, etc. as described with respect to the below implementation are intended to be instructive rather than limiting.

A tape drive A can receive a list of areas on a tape to be read, consisting of the first record number and the last record number of the RAO, with an upper limit of about 10,000 areas (instead of 2,730 as in currently implemented RAO). Experiments have indicated that when reading the current 2,730 areas by RAO is repeated three times, it is faster to read the areas in the order of record number, meaning an upper limit of 10,000 areas is reasonable. Commands used in current RAO implementations may be extended to increase the number of areas that can be received. Additionally, new small computer system interface (SCSI) commands may be defined to accommodate the increased number of areas, and new IDs may be added to a write buffer command to pass said increased areas.

Using the parameters inside the drive, the tape drive selects a directed graph (the cost of getting from point A to point B and the cost of reading the area) that is used in the typical traveling salesman problem from the given list of areas and returns it to the host. The parameters may include a combination of the static parameters and dynamic parameters as discussed previously. The host then uses the given directed graph to calculate the fastest reading order, using the resources in the host. If the size of the directed graph to be created is larger than the traffic of a single SCSI transfer, the aforementioned SCSI command may be used multiple times to acquire the entire graph.

Figure 3:
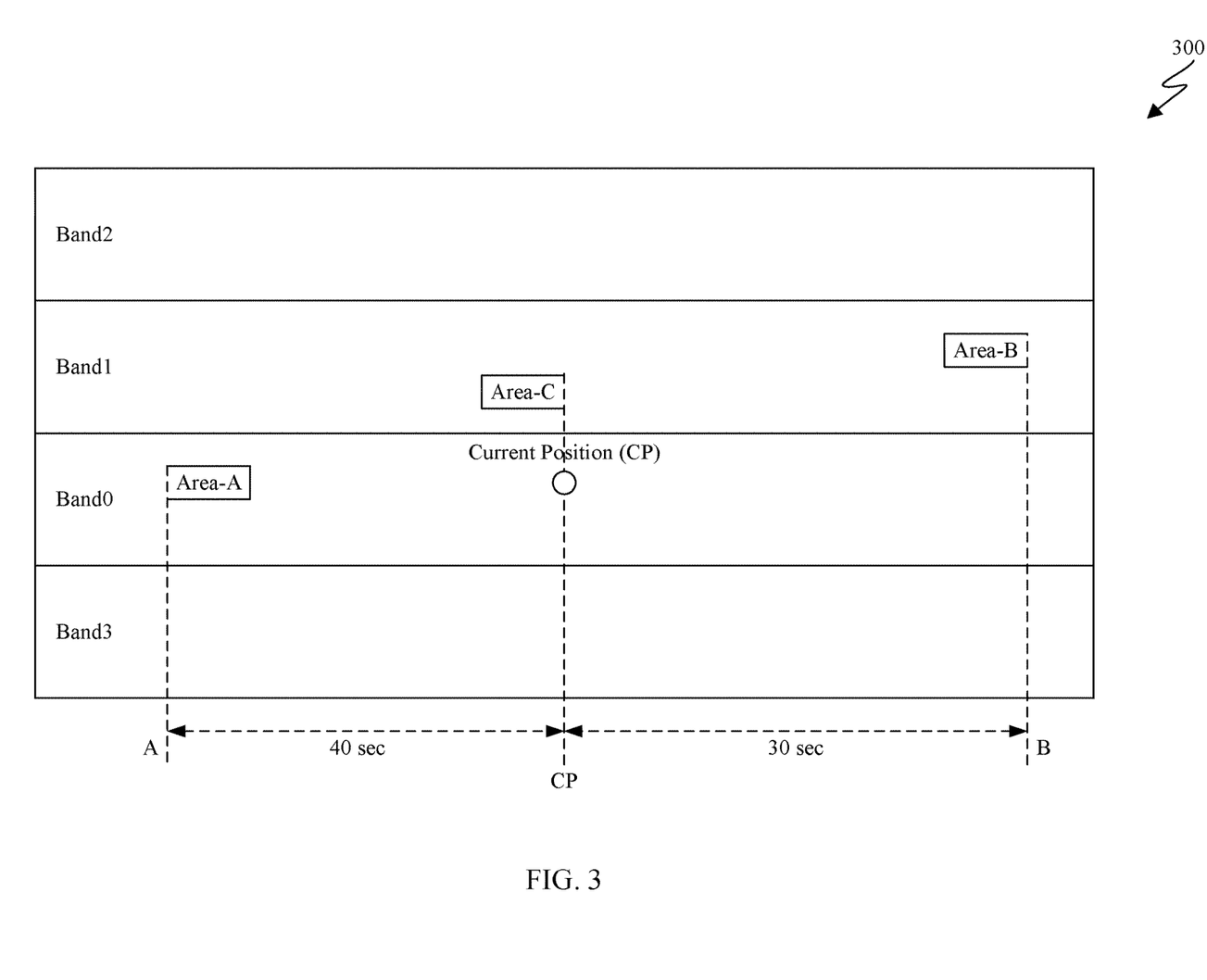
FIG. 3 depicts a sample tape mapping in accordance with at least one embodiment of the present invention.
Figure 4:
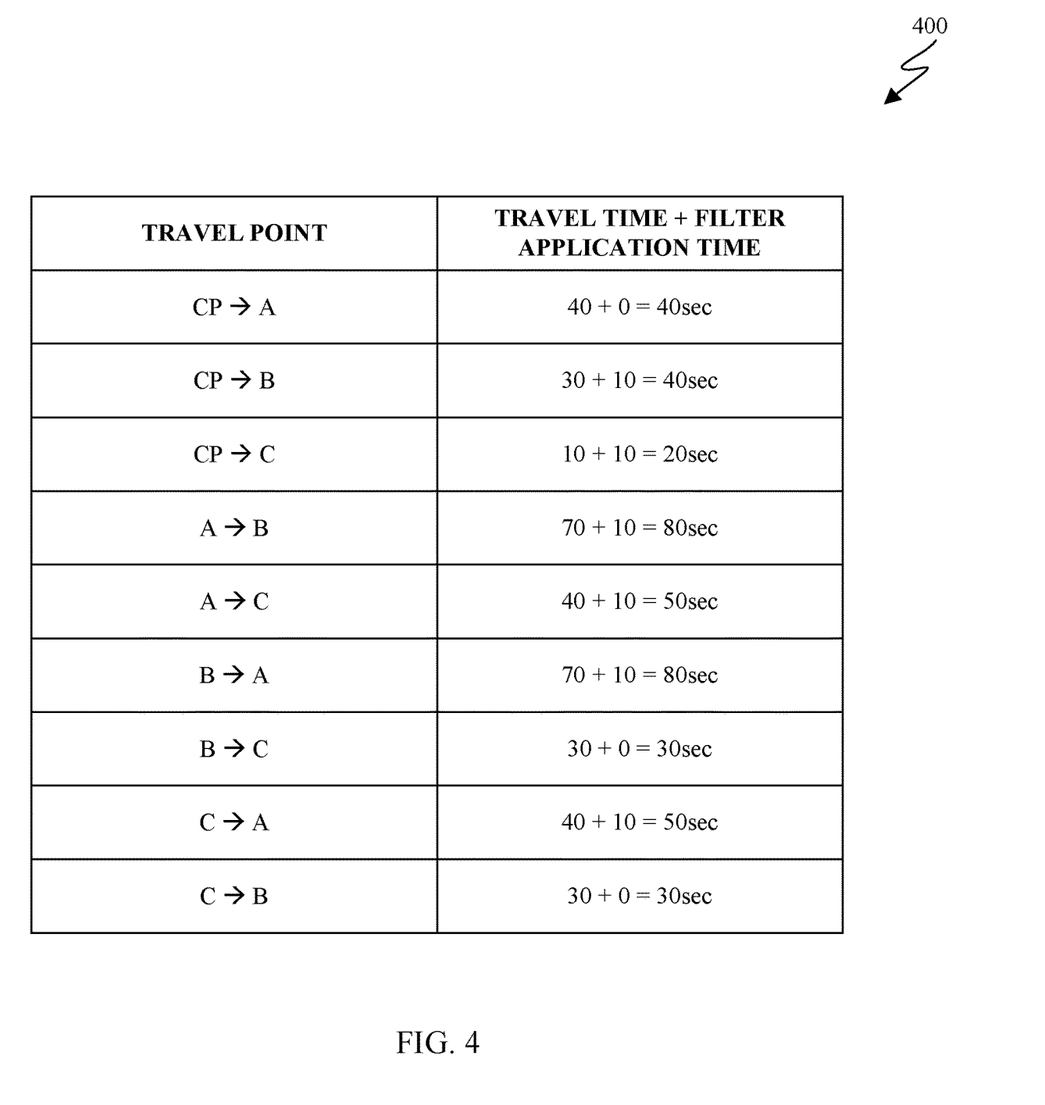
FIG. 4 is a table depicting times to read a record at two points in accordance with an embodiment of the present invention.

FIG. 3 depicts a tape mapping 300 in accordance with at least one embodiment of the present invention. FIG. 4 depicts a table 400 including times to read a record at two points in accordance with an embodiment of the present invention. FIG. 3 and FIG. 4 depict the same example embodiment of the present invention.

With respect to the depicted tape mapping 300, assume a case in which the read parameters of the head of Band 0 are different from those of Band 1 due to incompatibility with the head in a particular area of the tape. Assume, for simplicity, that the records are so small that the reading time is negligible. The directed graph shown by the table in FIG. 4 can be created in the drive to read records in three areas, A, B, and C, from the current Position (CP) shown in FIG. 3. Suppose that the travel from the current position to area C takes 10 seconds when the longitudinal position is the same and the band is different. Without considering the time to apply the filter, the fastest way is to cycle through CP to C to A to B, or CP to C to B to A. However, with the directed graph, CP to A to C to B (120 sec) or CP to B to C to A (120 sec) can be searched for. In this example, the outbound and inbound travel times are the same for the travel between two points; in other embodiments, the outbound and inbound travel times between two points may differ because the drive calculates the travel time between the points by taking into account other factors such as the time required to change direction, the reading time, and the reading distance (from the viewpoint of the travel to the next point) in some cases where a directed graph is useful.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
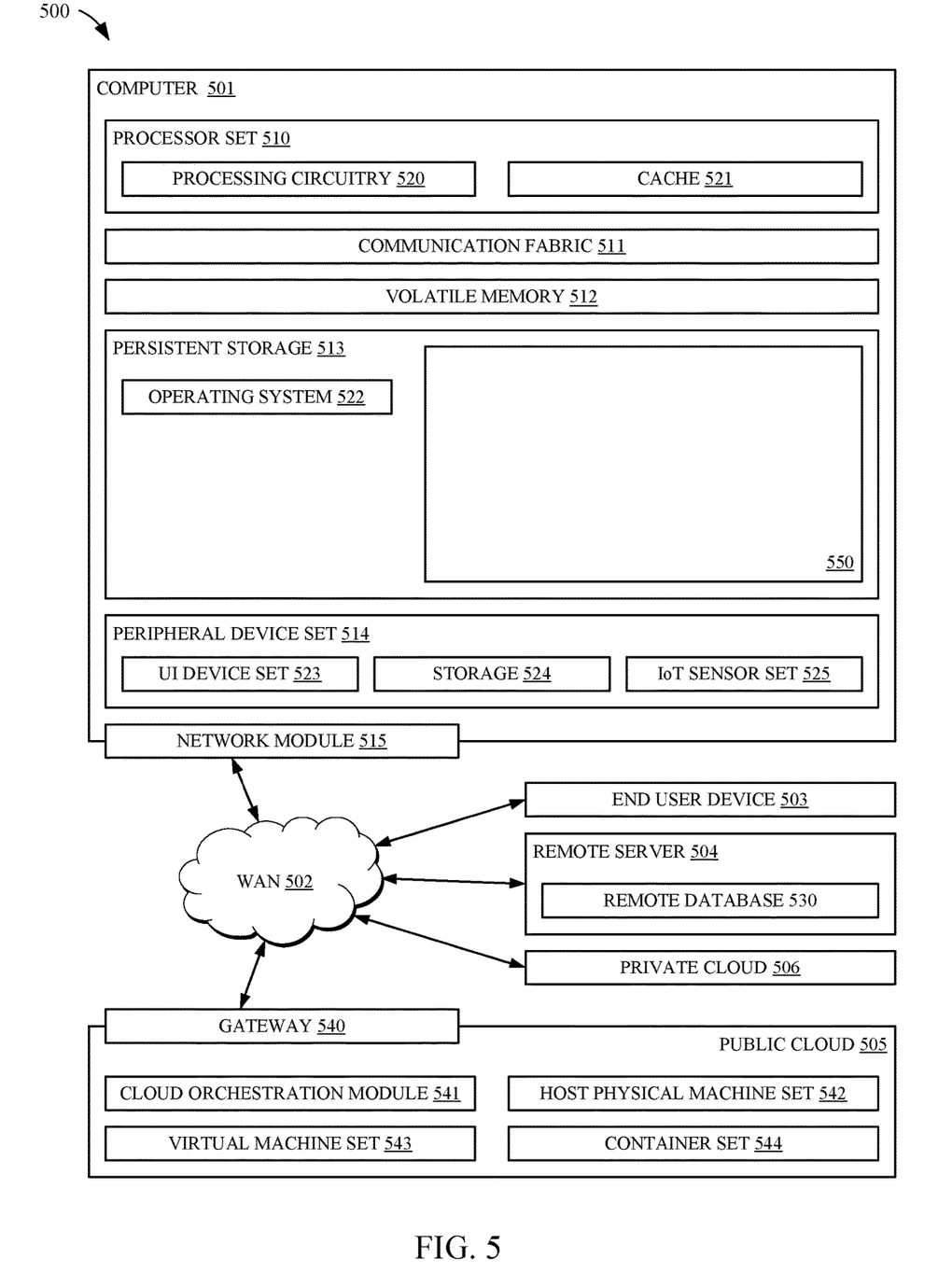
FIG. 5 is a block diagram of components of a computing system in accordance with an embodiment of the present invention.

Computing environment 500 contains an example of an environment for the execution of at least some of the computer code involved in performing the inventive methods, such as read management code 550. In addition to read management code 550, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and read management code 550, as identified above), peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 1. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 510 to control and direct performance of the inventive methods. In computing environment 500, at least some of the instructions for performing the inventive methods may be stored in read management code 550 in persistent storage 513.

COMMUNICATION FABRIC 511 is the signal conduction path that allows the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, volatile memory 512 is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

What is claimed is:

1. A computer implemented method comprising:
    receiving, by one or more processors, a list of areas on a subject tape comprising one or more subject areas to be read, wherein each area of the list of areas is indicated by a first record number and a last record number corresponding to said area;
    identifying, by one or more processors, parameters of a tape drive configured to read the subject tape, wherein the identified parameters of the tape drive contribute to a speed with which the tape drive can read the one or more subject areas, wherein the tape drive parameters comprise first dynamic parameters having first values corresponding to a first subject area of the tape drive and second dynamic parameters having second values corresponding to a second subject area of the tape drive, wherein the first values of the first dynamic parameters are different from the second values of the second dynamic parameters, wherein the first dynamic parameters and second dynamic parameters comprise a setup time for configuring head parameters, wherein the setup time for configuring head parameters is determined based on an amount of time to configure filter settings for reading specific subject areas of the tape drive;
    creating, by one or more processors, an executable file configured to create a directed graph of the one or more subject areas on the subject tape based on the identified parameters of the tape drive, wherein the directed graph indicates how long the tape drive will take to read the one or more subject areas; and
    determining, by one or more processors, a fastest reading order of the one or more subject areas on the subject tape, using the created executable.

2. The computer implemented method of claim 1, wherein the tape drive parameters comprise static parameters corresponding to the tape drive and the list of areas on the subject tape.

3. The computer implemented method of claim 2, wherein the static parameters are selected from the group consisting of tape acceleration, data band switching time, wrap switching time, distance between areas, and tape travel direction.

4. The computer implemented method of claim 1, further comprising reading the one or more subject areas on the subject tape in the determined fastest reading order.

5. The computer implemented method of claim 1, wherein determining a fastest reading order of the list of areas on the subject tape includes utilizing a travelling salesman problem algorithm to determine one or more shortest paths between the one or more subject areas of the subject tape.

6. The computer implemented method of claim 1, wherein the dynamic parameters are selected from the group consisting of a maximum speed of the subject tape moving from a first point to a second point, and a maximum speed for reading within a specified area.

7. The computer implemented method of claim 1, wherein the first dynamic parameters and second dynamic parameters further comprise a maximum speed for reading within a specified area.

8. A computer program product comprising:
    one or more computer readable storage media and program instructions stored on the one or more computer readable storage media, the program instructions comprising instructions to:
    receive a list of areas on a subject tape to be read comprising one or more subject areas, wherein each area of the list of areas is indicated by a first record number and a last record number corresponding to said area;
    identify parameters of a tape drive configured to read the subject tape, wherein the identified parameters of the tape drive contribute to a speed with which the tape drive can read the one or more subject areas, wherein the tape drive parameters comprise first dynamic parameters having first values corresponding to a first subject area of the tape drive and second dynamic parameters having second values corresponding to a second subject area of the tape drive, wherein the first values of the first dynamic parameters are different from the second values of the second dynamic parameters, wherein the first dynamic parameters and second dynamic parameters comprise a setup time for configuring head parameters, wherein the setup time for configuring head parameters is determined based on an amount of time to configure filter settings for reading specific subject areas of the tape drive;
    create an executable file configured to create a directed graph of the one or more subject areas on the subject tape based on the identified parameters, wherein the directed graph indicates how long the tape drive will take to read the one or more subject areas; and
    determine a fastest reading order of the one or more subject areas on the subject tape using the created executable file.

9. The computer program product of claim 8, wherein the tape drive parameters comprise static parameters corresponding to the tape drive and the list of areas on the subject tape.

10. The computer program product of claim 9, wherein the static parameters are selected from the group consisting of tape acceleration, data band switching time, wrap switching time, distance between areas, and tape travel direction.

11. The computer program product of claim 8, the program instructions further comprising instructions to read the one or more subject areas on the subject tape in the determined fastest reading order.

12. The computer program product of claim 8, wherein the instructions to determine a fastest reading order of the list of areas on the subject tape comprise instructions to utilize a travelling salesman problem algorithm to determine one or more shortest paths between the one or more subject areas of the subject tapes.

13. The computer program product of claim 8, wherein the dynamic parameters are selected from the group consisting of a maximum speed of the subject tape moving from a first point to a second point, a maximum speed for reading within a specified area, and a setup time of head parameters before reading a specified area.

14. A computer system comprising:
    one or more computer processors;
    one or more computer-readable storage media;

program instructions stored on the computer-readable storage media for execution by at least one of the one or more processors, the program instructions comprising instructions to:
receive a list of areas on a subject tape to be read comprising one or more subject areas, wherein each area of the list of areas is indicated by a first record number and a last record number corresponding to said area;
identify parameters of a tape drive configured to read the subject tape, wherein the identified parameters of the tape drive contribute to a speed with which the tape drive can read the one or more subject areas, wherein the tape drive parameters comprise first dynamic parameters having first values corresponding to a first subject area of the tape drive and second dynamic parameters having second values corresponding to a second subject area of the tape drive, wherein the first values of the first dynamic parameters are different from the second values of the second dynamic parameters, wherein the first dynamic parameters and second dynamic parameters comprise a setup time for configuring head parameters, wherein the setup time for configuring head parameters is determined based on an amount of time to configure filter settings for reading specific subject areas of the tape drive;
create an executable file configured to create a directed graph of the one or more subject areas on the subject tape based on the identified parameters, wherein the directed graph indicates how long the tape drive will take to read the one or more subject areas; and
determine a fastest reading order of the one or more subject areas on the subject tape using the created executable file.

15. The computer system of claim 14, wherein the tape drive parameters comprise static parameters corresponding to the tape drive and the list of areas on the subject tape.

16. The computer system of claim 15, wherein the static parameters are selected from the group consisting of tape acceleration, data band switching time, wrap switching time, distance between areas, and tape travel direction.

17. The computer system of claim 14, wherein the instructions to determine a fastest reading order of the list of areas on the subject tape comprise instructions to utilize a travelling salesman problem algorithm to determine one or more shortest paths between the one or more subject areas of the subject tapes.

18. The computer system of claim 14, wherein the dynamic parameters are selected from the group consisting of a maximum speed of the subject tape moving from a first point to a second point, a maximum speed for reading within a specified area, and a setup time of head parameters before reading a specified area.

* * * * *